United States Patent
Cho et al.

(10) Patent No.: US 10,994,376 B2
(45) Date of Patent: May 4, 2021

(54) NO-INDENTATION WELDING MONITORING DEVICE AND METHOD FOR MONITORING THE SAME

(71) Applicants: Hyundai Motor Company, Seoul (KR); Kia Motors Corporation, Seoul (KR); Obara Korea Corporation, Hwaseong-si (KR)

(72) Inventors: Do Woon Cho, Gunpo-si (KR); Kyunghwa Kwak, Hwaseong-si (KR); Doseok Yun, Hwaseong-si (KR)

(73) Assignees: Hyundai Motor Company, Seoul (KR); Kia Motors Corporation, Seoul (KR); Obara Korea Corporation, Hwaseong-si (KR)

( * ) Notice: Subject to any disclaimer, the term of this patent is extended or adjusted under 35 U.S.C. 154(b) by 350 days.

(21) Appl. No.: 16/176,909

(22) Filed: Oct. 31, 2018

(65) Prior Publication Data
US 2019/0126407 A1 May 2, 2019

(30) Foreign Application Priority Data
Nov. 1, 2017 (KR) .......................... 10-2017-0144494

(51) Int. Cl.
*B23K 31/12* (2006.01)
*B23K 11/11* (2006.01)
*B23K 11/25* (2006.01)

(52) U.S. Cl.
CPC .......... *B23K 31/125* (2013.01); *B23K 11/115* (2013.01); *B23K 11/255* (2013.01); *B23K 11/258* (2013.01)

(58) Field of Classification Search
CPC .. B23K 31/125; B23K 11/258; B23K 11/255; B23K 11/115
USPC ................... 219/91.2, 109, 110, 120, 121.64
See application file for complete search history.

(56) References Cited

U.S. PATENT DOCUMENTS

| 5,764,859 A * | 6/1998 | Kim ...................... B23K 11/252 |
| | | 219/109 |
| 2002/0053555 A1* | 5/2002 | Matsuyama ......... B23K 11/257 |
| | | 219/110 |

FOREIGN PATENT DOCUMENTS

| JP | 2006239706 A | * | 9/2006 |
| KR | 10-2003-0017016 A | | 3/2003 |
| KR | 20070021411 A | * | 2/2007 |
| KR | 10-1661665 B1 | | 9/2016 |
| KR | 10-1689172 B1 | | 12/2016 |
| KR | 10-2017-0028157 A | | 3/2017 |

* cited by examiner

*Primary Examiner* — Thien S Tran
(74) *Attorney, Agent, or Firm* — Morgan, Lewis & Bockius LLP

(57) ABSTRACT

A no-indentation welding monitoring device may include a pressing force measuring device for measuring a pressing force for pressing a welding target of a welding tip of a welding gun, a voltage measuring device for measuring a voltage applied to the welding tip of the welding gun, and a monitor device for digitizing a welding quality by use of the pressing force and the voltage transmitted from the pressing force measuring device and the voltage measuring device.

9 Claims, 12 Drawing Sheets

FIG. 8

Setting
* Memo :
* SQ Time : [ 1 ] ms     * Welding section : [ 34 ] ms     * Pressing force : [ 190 ] Kgf
* Pressing force variation range : [ ±45 ] Kgf
* Pressing force lowering value : NG | [ 50 ] || Warning || [ 80 ] | OK | [ 110 ] || Warning || [ 120 ] | NG
* Voltage value : NG | [ 2300 ] || Warning || [ 2900 ] | OK |

Score
*Pressing force determination score before welding : NG = [ 0 ]     OK = [ 25 ]     OK = [ 50 ]
*Pressing force lowering determination score         : NG = [ 0 ]     Warning = [ 25 ]     OK = [ 100 ]
*Voltage determination score                         : NG = [ 0 ]     Warning = [ 50 ]
*Total determination score                           : NG = [ 100 ]   || Warning || [ 150 ]   || OK

NO-INDENTATION WELDING MONITORING DEVICE AND METHOD FOR MONITORING THE SAME

CROSS-REFERENCE TO RELATED APPLICATION

The present application claims priority to Korean Patent Application No. 10-2017-0144494 filed on Nov. 1, 2017, the entire contents of which is incorporated herein for all purposes by this reference.

BACKGROUND OF THE INVENTION

Field of the Invention

The present invention relates a no-indentation welding monitoring device and method for the same. More particularly, the present invention relates to a no-indentation welding monitoring device and method for monitoring whether or not a condition of successful no-indentation welding has been achieved when performing no-indentation welding without indentation during spot welding.

Description of Related Art

Generally, in the case of spot welding, welding is performed by applying electrical energy while pressing the welding material on both sides of the welding gun with the tip portion of the welding gun contacting with the physical force. According to such conventional spot welding, the indentation remains on the welding material as shown in FIG. 9A.

In contrast, the no-indentation welding is applied to a panel mainly seen outside, and a protrusion is formed on a panel to be welded using a previously provided protrusion molding machine, and the panel is welded to the protrusion through a welding gun. The indentations do not remain on the panel at all or almost as shown in FIG. 9B.

In the no-indentation welding, since the indentation is not visually observed, it is difficult to visually determine the welding quality during welding. Therefore, there is a demand for a technique for determining whether no-indentation welding is properly performed.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a no-indentation welding monitoring device and a method for the same which can easily determine the quality of the indentation welding even when the indentation is absent and can utilize the characteristics of the configuration of the indentation welding to minimize the error.

Various aspects of the present invention are directed to providing a no-indentation welding monitoring device and a method for the same configured for rapidly and precisely determining an amount of determination for determining quality of no-indentation welding.

Furthermore, various aspects of the present invention are directed to providing a no-indentation welding monitoring device and a method for the same which can store a history of no-indentation welding and enable data browsing, analysis, and output after the inspection to unify the management.

A no-indentation welding monitoring device according to an exemplary embodiment of the present invention may include a pressing force measuring device for measuring a pressing force for pressing a welding target of a welding tip of a welding gun, a voltage measuring device for measuring a voltage applied to the welding tip of the welding gun, and a monitor device for digitizing a welding quality by use of the pressing force and the voltage transmitted from the pressing force measuring device and the voltage measuring device.

A no-indentation welding monitoring device according to an exemplary embodiment of the present invention may further include a communication device for transmitting the measured values of the pressing force measuring device and the voltage measuring device to the monitoring device.

The monitoring device may determine the welding quality using an average value of the pressing force formed between a pressure stabilization time point and a power application time point, a minimum value of the pressing force in a welding section to which the power is applied, and a maximum value of the voltage in the welding section.

The welding tip may include an upper tip and a lower tip which are in close contact with the upper and lower surfaces of plates to be coupled to each other to apply power to the plates.

The voltage measuring device may measure the voltage applied to the plates through the upper tip and the lower tip portion The pressing force measuring device may include a load cell for measuring the pressing force applied to the upper tip and the lower tip when the upper tip and the lower tip press the upper and lower surfaces of the welding target.

Method for monitoring no-indentation welding according to an exemplary embodiment of the present invention may include contacting an upper welding tip and a lower welding tip of a welding gun to both sides of a welding target and pressing, detecting a pressing force by which the upper welding tip or the lower welding tip presses the welding target, applying a voltage to the welding target through the upper welding tip or the lower welding tip portion, and detecting a voltage to be applied, and determining a score using the detected pressure and voltage.

The welding quality may be determined by the determined score.

The score may be determined by an average value of the pressing force formed between the pressure stabilization time point and a power application time point, a minimum value of the pressing force in a welding section to which the power is applied, and a score determined by a maximum value of the voltage in the welding section.

After the power is applied to the welding target, a predetermined pressure holding time is maintained and the pressing force may be removed.

A no-indentation welding monitoring system according to an exemplary embodiment of the present invention may perform the method for monitoring no-indentation welding.

According to the no-indentation welding monitoring device and method for the same, even if there is no-indentation, the welding quality may be accurately determined and the characteristics of the indentation welding may be utilized to minimize the determination error.

Furthermore, the load for determining the quality of the no-indentation welding may be remarkably reduced, and the determination may be made rapidly and accurately.

Furthermore, it is possible to store the history of no-indentation welding and to enable data browsing, analysis, and output after the inspection to unify the management.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 8 is a screen view of a program for performing the method for monitoring no-indentation welding according to an exemplary embodiment of the present invention.

Figure 1:
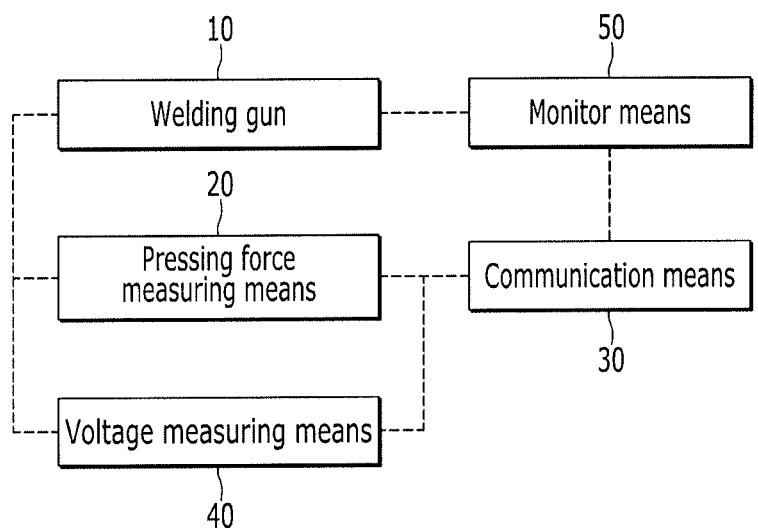
FIG. 1 is a general schematic diagram of a no-indentation welding monitoring device according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings.

Furthermore, in the drawings, a size and thickness of each element are randomly represented for better understanding and ease of description, and the present invention is not limited thereto and the thickness of layers, films, panels, regions, etc., are exaggerated for clarity.

However, the drawings and description are to be regarded as illustrative in nature and not restrictive. Like reference numerals designate like elements throughout the specification.

The terms "first", "second" etc. In the following description is for discriminating the configurations because the names are the same and the present invention is not limited to the order.

Furthermore, the description according to the exemplary embodiment of the present invention may be selectively understood with reference to the contents and drawings mentioned in the related art.

FIG. 1 is a general schematic diagram of a no-indentation welding monitoring device according to an exemplary embodiment of the present invention.

Referring to FIG. 1, a no-indentation welding monitoring device of the present invention includes a pressure measuring device 20 provided for each welding gun 10, a voltage measuring device 40, a communication device 30 and a monitor device 50 for collecting and determining data.

The pressing force measuring device 20 and the voltage measuring device 40 are connected to the monitoring device 50 via a wired or wireless analog or digital communication network by the communication device 30.

The monitor device 50 stores the measured values received from the communication device 30 for each time and provides the measured values to at least one of searching, managing and outputting, and can provide results of the determination of the no-indentation welding quality according to the pressing force and the voltage.

Figure 2:
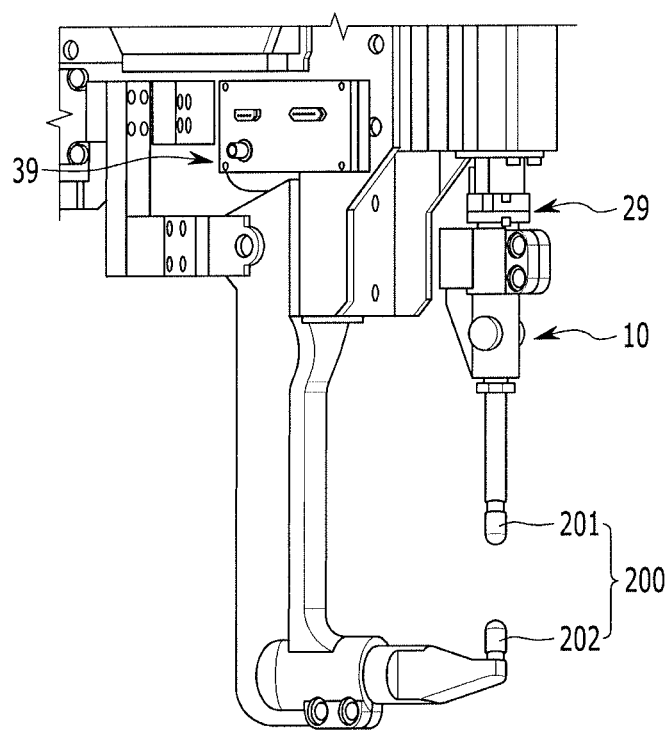
FIG. 2 is a partial side view showing a welding gun according to an exemplary embodiment of the present invention.

FIG. 2 is a partial side view showing a welding gun according to an exemplary embodiment of the present invention.

Referring to FIG. 2, the welding gun 10 includes an upper tip 201, a lower tip 202 and a load cell 29 as a pressing force measuring device 20 for measuring the pressing force applied to the upper tip 201. Here, the upper tip 201 and the lower tip 202 may be collectively referred to as a welding tip 200.

The load cell 29 is disposed on the upper side of the upper tip 201 of the welding gun 10 mounted on the robot arm of at least one robot to measure the pressing force applied to the welding target.

In an exemplary embodiment of the present invention, the pressing force measuring device 20 includes the load cell 29. However, the pressing force measuring device 20 may be a piezo-electric sensor, and the pressing force may indirectly be determined by a laser distance sensor.

Furthermore, the structure and principle of the load cell 29, the piezoelectric sensor, and the laser distance sensor are described in the related art.

In an exemplary embodiment of the present invention, an amplifier 39 is mounted on one side of the welding gun 10 as the communication device 30 and the amplifier 39 may transmit the measured values of the pressing force measuring device 20 and the voltage measuring device 40 to the monitor device 50 via the communication network.

Furthermore, the communication device 30 may include the amplifier 39, but communication device without amplification function may be used, for example.

Figure 3:
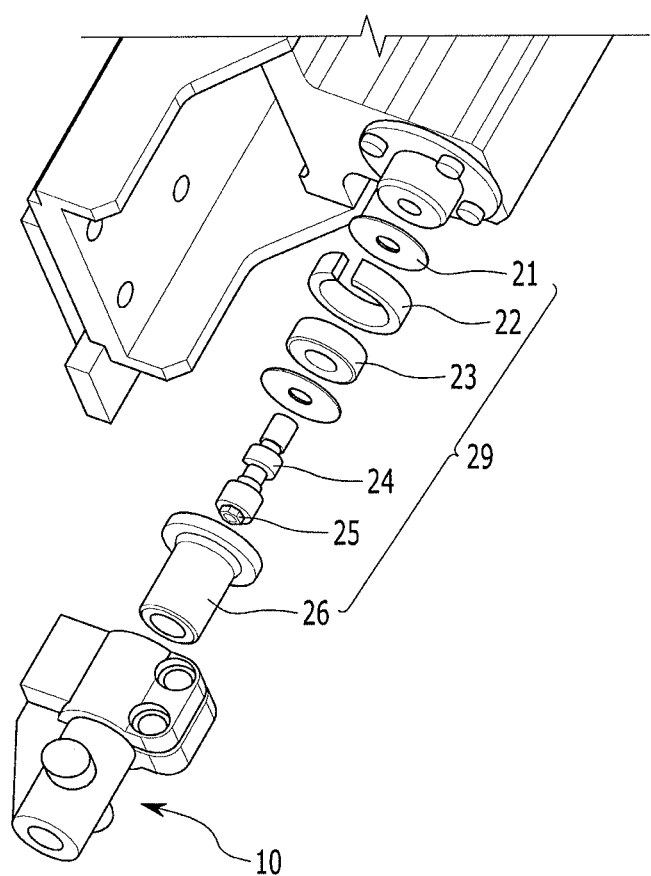
FIG. 3 is an exploded perspective view of a load cell provided in a welding gun according to an exemplary embodiment of the present invention.

FIG. 3 is an exploded perspective view of a load cell provided in a welding gun according to an exemplary embodiment of the present invention.

Referring to FIG. 3, the load cell 29 may include an insulating washer 21, a block 22, a load cell body 23, a bushing 24, a bolt 25, and a rod 26, which are in turn assembled to the welding gun 10.

Here, the pressure force applied by the load cell main body 23 through the upper tip 201 and the rod 26 can be detected, and the structure of the load cell main body 23 and the principle of detecting the pressing force can be referred to a known technique.

Furthermore, the voltage measuring device 40 measures the voltage applied to the welding gun 10, and a voltmeter which is already known can be used although not shown.

Figure 4:
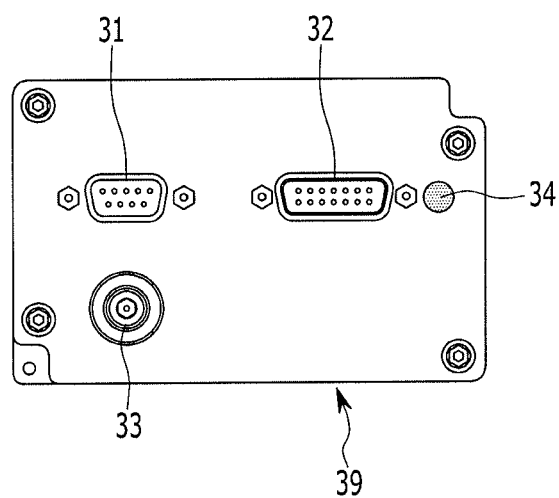
FIG. 4 is a side view of an amplifier according to an exemplary embodiment of the present invention.

FIG. 4 is a side view of an amplifier according to an exemplary embodiment of the present invention.

Referring to FIG. 4, the amplifier 39 may include, for example, a setting communication port 31, an amplifier control port 32, a load cell port 33 to which a load cell is connected, and a status indicator 34.

Figure 5:
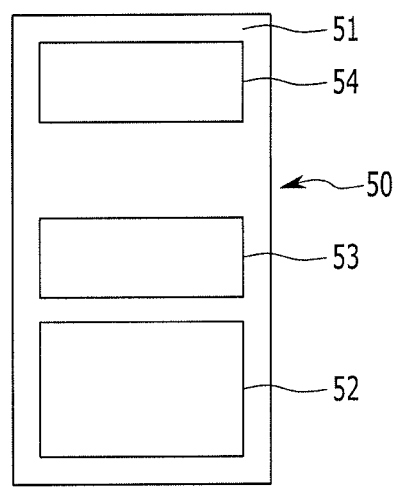
FIG. 5 is a front view of the monitor device provided in a no-indentation welding monitoring device according to an exemplary embodiment of the present invention.

FIG. 5 is a front view of the monitor device provided in a no-indentation welding monitoring device according to an exemplary embodiment of the present invention.

Referring to FIG. 5, the monitor device 50 may include a control box 52 having a controller and housed in the rack 51 and connected to a plurality of communication device 30, a PC 53 that receives data of the control box 52 and performs functions such as search, management, output, and the like, and a monitor screen 54 of the PC 53.

A storage device for storing the history data of the welding operation may be provided in at least one of the control box 52 and the PC 53.

With the present configuration, the time, press force, and voltage data for the operation of the no-indentation welding are measured by the pressing force measuring device 20 and the voltage measuring device 40, transmitted by the communication device 30, collected and stored in the monitor device 50.

The monitor device 50 provides a search, management and output function of the history of the welding operation by a computer program recorded on a computer-readable recording medium. As such, the monitor device 50 provides the result of the determination of the no-indentation welding quality in accordance with the predetermined determination result based on the pressing force and the voltage.

Therefore, according to an exemplary embodiment of the present invention, even if the welding indentations are not formed, the welding quality may be accurately determined and the characteristics of no-indentation welding may be properly utilized, so that the determination error may be minimized by the pressing force and the voltage.

Since the pressing force and the voltage are used, the amount of determination for determining the degree of no-indentation welding quality is significantly reduced, and a quick and accurate determination may be made. Furthermore, it is possible to store the history of no-indentation welding and to enable data browsing, analysis, and output after the inspection to unify the management.

On the other hand, the determination of the no-indentation welding quality according to the pressing force and the voltage is performed such that the average value of the pressing force after stabilization before welding, the minimum value of the pressing force during welding, and the score determined based on the voltage value during welding are equal to or greater than a predetermined value It is preferable to be configured such that it is determined to be good.

Since the spot welding according to an exemplary embodiment of the present invention is to pressurize and energize electricity, the welding protrusion (110 in FIG. 10) of the welding target is melted and the pressing force is changed, in particular, the pressing force is lowered. The present invention makes it possible to determine whether the no-indentation welding has been successfully performed by use of the present characteristic correctly.

Figure 6:
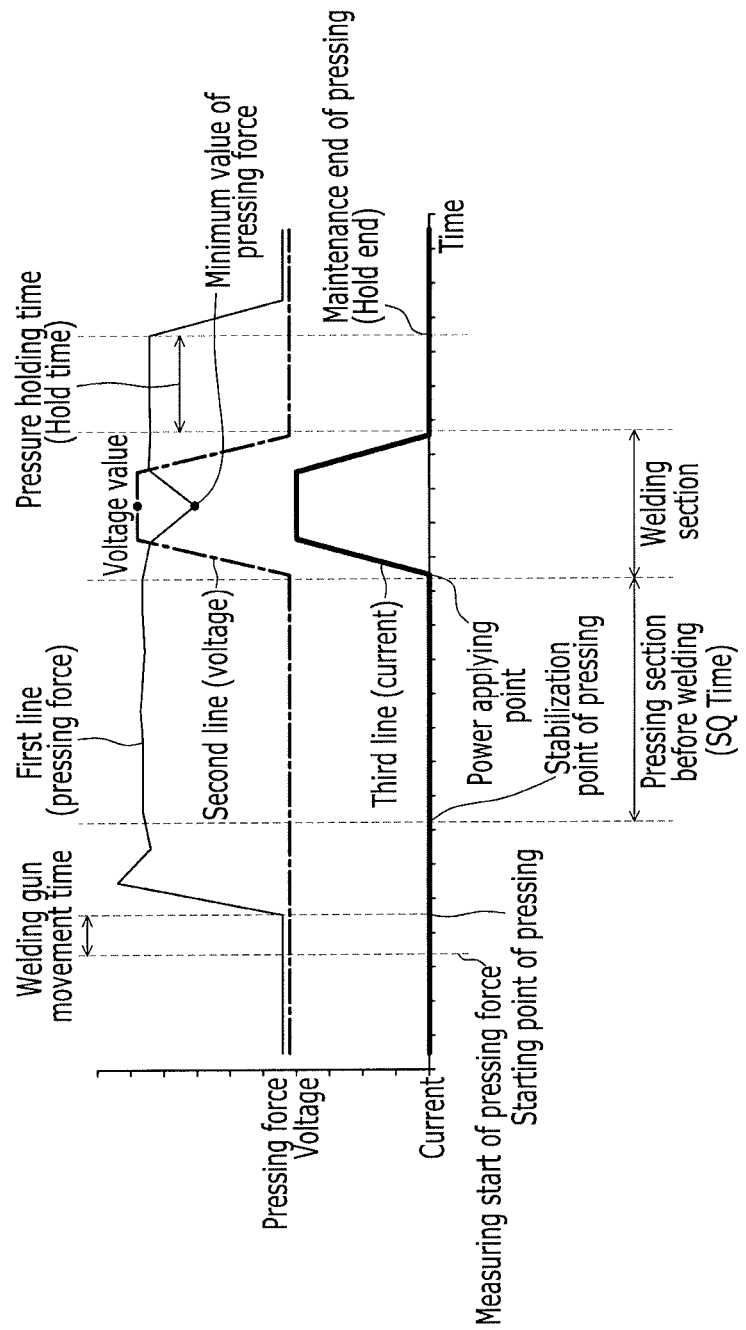
FIG. 6 is a graph showing a pressing force, a voltage, a current, and the like applied to a welding tip to perform the no-indentation welding according to an exemplary embodiment of the present invention on a time basis.

FIG. 6 is a graph showing a pressing force, a voltage, a current, and the like applied to a welding tip to perform the no-indentation welding according to an exemplary embodiment of the present invention on a time basis.

Referring to FIG. 6, the first line represents the pressing force, the second line represents the voltage, and the third line represents the current.

The voltage and current are each applied briefly for a predetermined time only in the weld zone, moving the welding gun 10 to the welding point in a welding ready state and increasing the pressing force upon arrival at the welding point.

When the target pressing force is reached, it waits until it is stabilized while being pressurized, and waits for SQ TIME after the pressure stabilization time point.

The voltage and current are applied according to the signal of the welding activation and it is released after a predetermined time. As such, after the pressure hold time has elapsed, the pressing force is released at the time of hold end portion of the pressure.

Based on FIG. 6 and the description thereof, the quality of the no-indentation welding may be determined by the score determined based on the three criteria of the pressing force arrival determination, the pressing force lowering determination and the voltage determination.

Figure 7:
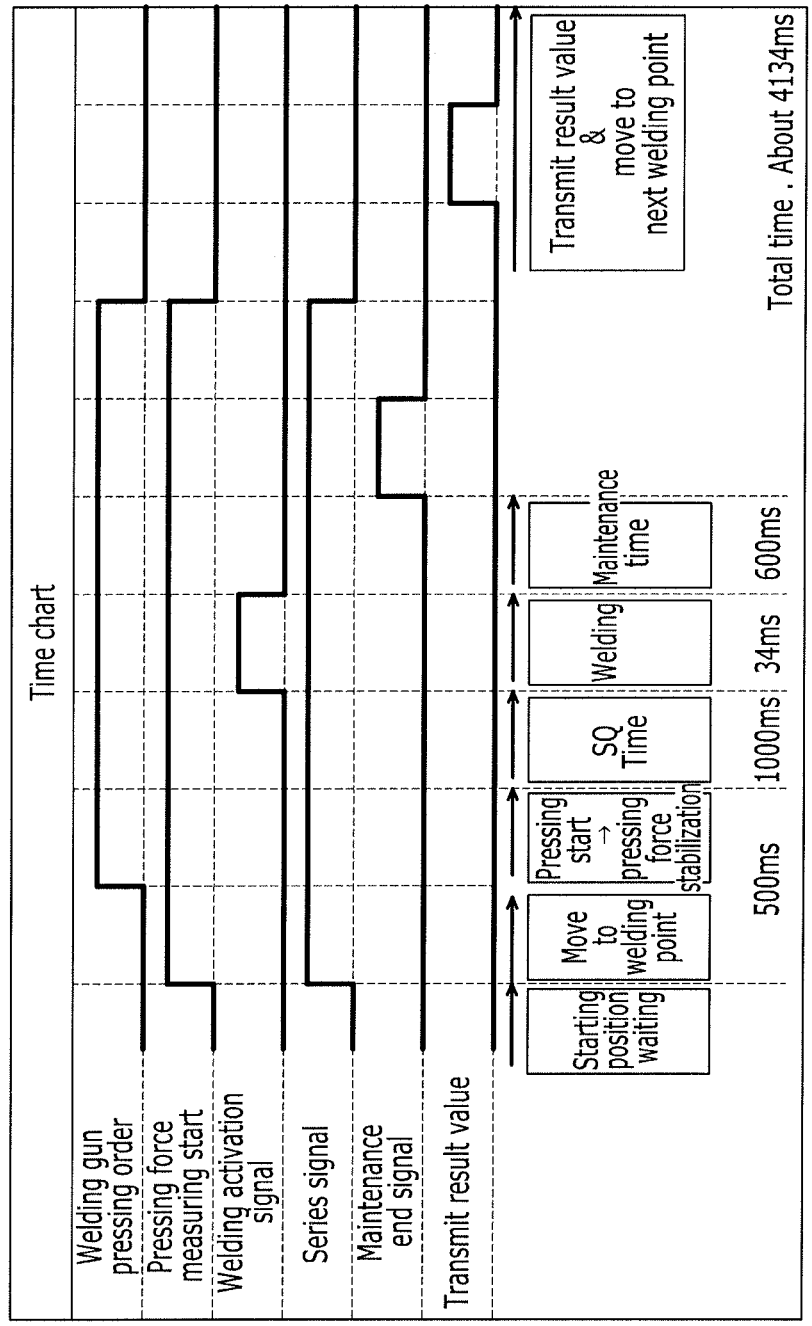
FIG. 7 shows an IO time chart in the no-indentation welding in the same manner as FIG. 6.
Figure 9A:
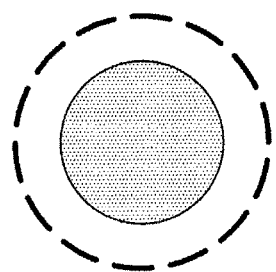
FIG. 9A and FIG. 9B are schematic plan views showing the state of the welding surface according to the indentation welding and the no-indentation welding.
Figure 9B:
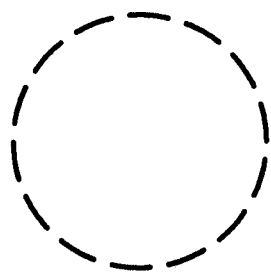

FIG. 7 shows an IO time chart in the no-indentation welding in the same manner as FIG. 6.

In FIG. 7, the pressing point and the end point of pressing the welding gun 10, starting and ending points of pressing force measurement, starting and ending points of welding activation signal, starting and ending points of the series signal, the maintenance end point of the pressing force, starting point of transmitting result value etc. Are shown in chronological order.

The reference of the starting point includes the start of welding, movement to welding point, start of pressing and stabilization time, SQ TIME, welding, and holding time, and after the result value is transmitted to the next welding point.

FIG. 8 is a screen view of a program for performing the method for monitoring no-indentation welding according to an exemplary embodiment of the present invention.

Referring to FIG. 8, within the configuration area of the screen, the SQ TIME may be set to 1 ms, the welding period to 34 ms, the pressing force to 190 Kgf, and the pressing force variation range to be within 45 Kgf.

When the pressing force lowering value is less than 50, NG, 50 or more and less than 80, Warning, 80 or more and less than 110, OK, 110 or more and less than 120, Waring, and 120 or more, NG.

The voltage value indicates the voltage to be detected. If the voltage is less than 2300, NG, 2300 or more and less than 2900, Warning, 2900 or more, OK.

Referring to FIG. 8, within the scoring domain, in the pressing force before welding, NG is 0 point and OK is 25 points, in the determination of the pressing force lowering, NG is 0 point, Warning is 25 points, and OK is 50 points. In the voltage determination, NG indicates 0 point, Warning indicates 50 points, and OK indicates 100 points.

If the total score is less than 100 points, the welding quality is NG (poor), if the total score is more than 100 points and less than 150 points, the welding quality is Warning (warning), and if the total score is more than 150 points, the welding quality is OK (pass).

Figure 10:
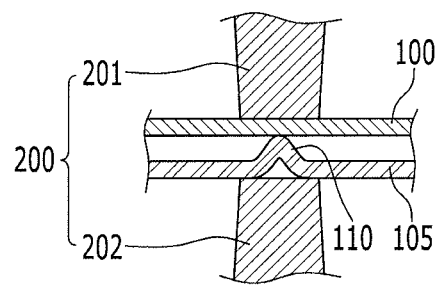
FIG. 10 is a schematic cross-sectional view exemplarily illustrating a no-indentation welding gun and a welding target according to an exemplary embodiment of the present invention.

FIG. 10 is a schematic cross-sectional view exemplarily illustrating a no-indentation welding gun and a welding target according to an exemplary embodiment of the present invention.

Referring to FIG. 10, the welding target includes an upper plate 100 and a lower plate 105 which are overlapped with each other and the lower plate 105 is bent upward to form welding protrusions 110, and the welding protrusions 110 are formed on the upper plate 100 close to the bottom surface of the upper plate 100.

The upper tip 201 of the welding gun 10 is in close contact with the upper surface of the upper plate 100 at a position corresponding to the welding projection 110, and the lower tip 202 is in close contact with the lower surface of the lower plate 105 at a position corresponding to the welding projection 110, and the upper tip 201 and the lower tip 202 apply power and apply a pressing force through the welding protrusions 110.

Referring to FIGS. 10 and 6, the welding protrusion 110 is hard, but is gradually melted by the power, and the pressing force applied to the welding tip 200 is momentarily lowered. As such, when the upper plate 100 and the lower plate 105 come into close contact with each other, the pressing force returns to a constant value again.

In an exemplary embodiment of the present invention, to perform the no-indentation welding, after the welding protrusions 110 are formed on the lower plate 105 or the upper plate 100, the welding protrusions 110 are melted by applying pressure and power. By use of these features, the quality of the no-indentation welding is determined by the pressing force lowering and the voltage, so that it is possible to form a quick, accurate and meaningful determination with a very small amount of determination.

Figure 11:
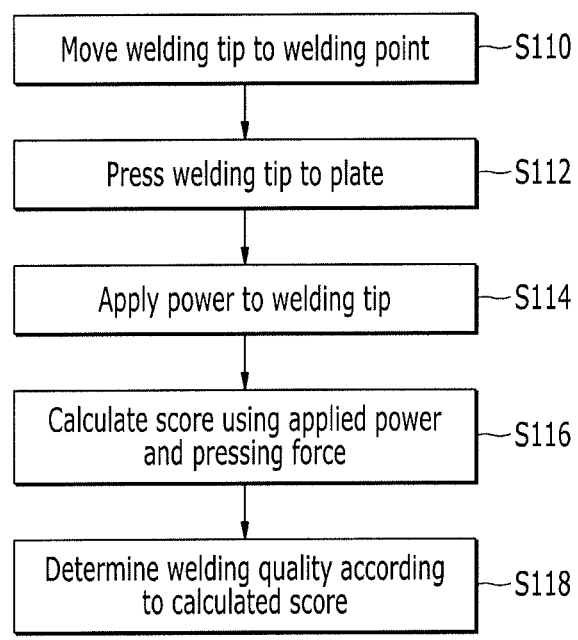
FIG. 11 is a flow chart showing a method for monitoring no-indentation welding according to an exemplary embodiment of the present invention.

FIG. 11 is a flow chart showing a method for monitoring no-indentation welding according to an exemplary embodiment of the present invention.

Referring to FIG. 11, in S110, the welding tip 200 is moved from the plate to be welded to the welding point where the welding protrusion 110 is formed. In S112, the welding tip 200 is contacted with the welding target, and pressurized with set pressure.

In S114, the welding tip 200 applies a power having a current and a voltage set to the welding target side, and determines a score using the voltage applied in S116 and the lowering value of the pressing force.

As such, the points determined at S118 are added up, and the welding quality is determined as NG, Warning, OK, or the like.

In an exemplary embodiment of the present invention, the method for monitoring no-indentation welding using the no-indentation welding monitoring device includes pressing force measuring step, voltage measuring step, measuring value transmitting step, and result providing step.

The pressing force measuring step is a step of measuring the pressing force from the pressing force measuring device 20 mounted on the welding gun 10 mounted on the end portion of the robot arm of at least one robot.

The voltage measuring step is a step of measuring a voltage applied to the welding gun 10 by the voltage measuring device 40.

The measured value transmission step is a step of transmitting the pressing force measured value and the voltage measured value to the monitoring device 50 via the communication network by the communication device 30.

The result providing step is a step in which the monitor device 50 stores measured values received from the communication device 30 by time and provides the measured values to at least one of searching, managing and outputting, and the result of the determination of the quality according to the pressing force and the voltage is provided.

Therefore, according to an exemplary embodiment of the present invention, even if the welding indentations are not formed, the welding quality may be accurately determined and the characteristics of no-indentation welding may be properly utilized, so that the determination error may be minimized by the pressing force and the voltage.

Since the pressing force and the voltage are used, the amount of determination for determining the degree of no-indentation welding quality is significantly reduced, and a quick and accurate determination may be made. Furthermore, it is possible to store the history of no-indentation welding and to enable data browsing, analysis, and output after the inspection to unify the management.

By performing the above-mentioned method for monitoring no-indentation welding, a computer program recorded on a computer-readable recording medium causes a computer to execute a pressing force measuring step, a voltage measuring step, a measured value transmitting step and a result providing step.

The computer program can monitor two robots, that is, two welding guns 10, with one PC 53, for example.

According to an exemplary embodiment of the present invention, even if the welding indentations are not formed, the welding quality may be accurately determined and the characteristics of no-indentation welding may be properly utilized, so that the determination error may be minimized by the pressing force and the voltage.

Since the pressing force and the voltage are used, the amount of determination for determining the degree of no-indentation welding quality is significantly reduced, and a quick and accurate determination may be made. Furthermore, it is possible to store the history of no-indentation welding and to enable data browsing, analysis, and output after the inspection to unify the management.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present inven-

What is claimed is:

1. A no-indentation welding monitoring apparatus, comprising:
   a pressing force measuring device measuring a pressing force for pressing a welding target by a welding tip of a welding gun;
   a voltage measuring device measuring a voltage applied to the welding tip of the welding gun; and
   a monitor device including a controller and digitizing a welding quality of the welding target by use of the measured pressing force and the measured voltage transmitted from the pressing force measuring device and the voltage measuring device, respectively,
   wherein the monitoring device determines the welding quality using an average value of the pressing force formed between a pressure stabilization time point and a power application time point, a minimum value of the pressing force in a welding section to which a power is applied, and a maximum value of the voltage in the welding section.

2. The no-indentation welding monitoring apparatus of claim 1, further including:
   a communication device transmitting values of the measured pressing force of the pressing force measuring device and the measured voltage of the voltage measuring device to the monitoring device.

3. The no-indentation welding monitoring apparatus of claim 1, wherein the welding tip includes an upper tip and a lower tip which are in contact with upper and lower surfaces of plates of the welding target to be coupled to each other to apply the power to the plates.

4. The no-indentation welding monitoring apparatus of claim 3, wherein the voltage measuring device measures the voltage applied to the plates of the welding target through the upper tip and the lower tip.

5. The no-indentation welding monitoring apparatus of claim 3, wherein the pressing force measuring device includes a load cell for measuring the pressing force applied to the upper tip and the lower tip when the upper tip and the lower tip press the upper and lower surfaces of the plates of the welding target.

6. A method for monitoring no-indentation welding, the method including:
   contacting an upper welding tip and a lower welding tip of a welding gun to a first side and a second side of a welding target and pressing;
   detecting a pressing force applied to the welding target, wherein the pressing is performed by the upper welding tip or the lower welding tip to press the welding target by the pressing force;
   applying a voltage to the welding target through the upper welding tip or the lower welding tip, and detecting the applied voltage; and
   determining, by a controller, a score using the detected pressing force and the applied voltage,
   wherein the score is determined by an average value of the pressing force formed between a pressure stabilization time point and a power application time point, a minimum value of the pressing force in a welding section to which a power is applied, and a maximum value of the voltage in the welding section.

7. The method for monitoring the no-indentation welding of claim 6, wherein a welding quality of the welding target is determined by the score.

8. The method for monitoring the no-indentation welding of claim 6, wherein after the power is applied to the welding target, a predetermined pressure holding time is maintained and the pressing force is removed.

9. A no-indentation welding monitoring system for performing the method for monitoring the no-indentation welding of claim 6.

* * * * *